Feb. 16, 1943.   H. N. MARSH   2,311,312
CONTINUOUS MUD WEIGHT INDICATOR
Filed Feb. 17, 1941

HALLAN N. MARSH
INVENTOR
ATTORNEY

Patented Feb. 16, 1943

2,311,312

UNITED STATES PATENT OFFICE 2,311,312

CONTINUOUS MUD WEIGHT INDICATOR

Hallan N. Marsh, Huntington Park, Calif., assignor to Socony-Vacuum Oil Company, Incorporated, New York, N. Y., a corporation of New York Application February 17, 1941, Serial No. 379,168

1 Claim. (Cl. 265—44)

The object of the invention is to provide a means for continuously ascertaining or recording the specific gravity of a flowing liquid, as for example the circulating fluid or "drilling mud" used in drilling oil wells by the rotary method.

In the drilling of rotary wells a thinly plastic mud is circulated down the drill pipe and up through the casing surrounding it, for the purpose of removing the drillings from the well as they are produced. It is important to control the specific gravity of this mud, to adapt it to conditions encountered during the drilling of the well, and to keep its weight constant so long as these conditions do not change.

Numerous devices have been proposed for obtaining a continuous indication or record of the mud weight, but all of them, so far as I am aware, are unreliable. I have discovered by experimenting with numerous devices of this class that the inaccuracy is due in most cases to the accumulation of suspensoids, usually solids, on the moving part of the device, i. e., the part which actuates the scale member. In the cited instance of drilling mud this accumulation takes the form of a sheath of heavy and partly solidified mud which contains less water and therefore is heavier than the mud flowing through the apparatus. Where such devices are used for ascertaining or recording the weight of other suspensions, as for example that of a stream of oily condensate containing suspended water particles, these particles attach themselves to the moving part and increase its weight.

The device herein described is free from this source of inaccuracy for the reason that, dynamic reaction of the moving stream being eliminated, it is possible so to increase the velocity of the flowing liquid as to prevent the segregation and accumulation of the heavier constituents of the suspension anywhere in the system.

The invention may best be understood with reference to the attached drawing illustrating preferred forms of the device in which.

Figures 1, 2, 3, 4:
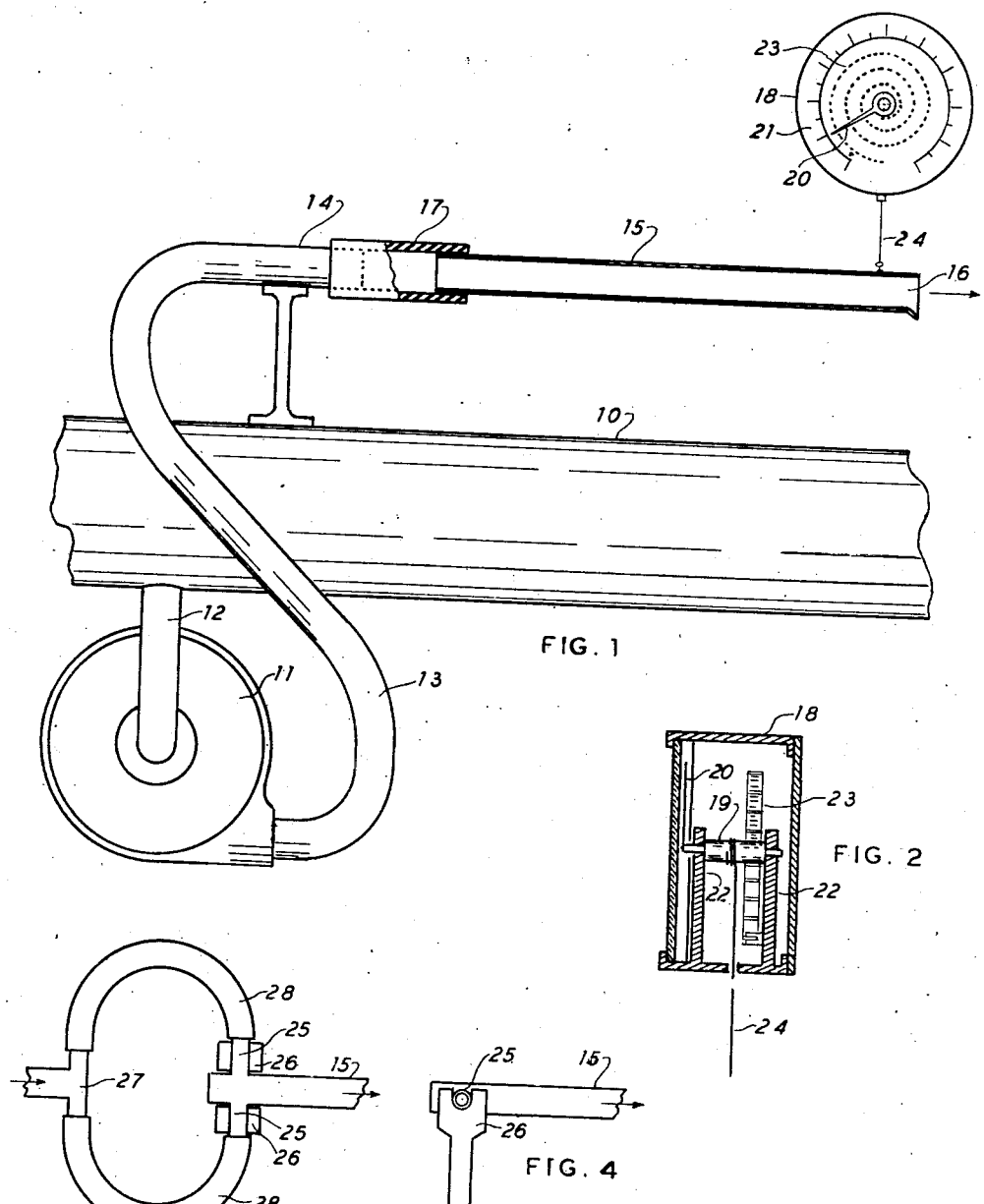
Fig. 1, shows in elevation a simple form of the entire apparatus.
Fig. 2 is a cross-section through the scale element 18 of Fig. 1.
Fig. 3 shows a fragment of a modified form of the device, in plan.
Fig. 4 is a side elevation of the form of Fig. 3.

Referring first to Fig. 1 of the drawing, 10 represents any pipe or launder through which the fluid to be weighed is flowing under a low pressure down to atmospheric. A small centrifugal pump 11, driven by a motor or other source of power not shown, draws a stream of the fluid through a tube 12 and discharges it through a tube 13 which is fixed in position. To the outlet end 14 of the fixed tube is attached a floating tube 15 which has a free discharge at its open end 16. Attachment is made by means of a section 17 of flexible tubing of such length and wall thickness as to interpose no appreciable resistance to a limited vertical movement of the open end of tube 15.

This end of tube 15 is coupled to a weighing device or scale 18. This scale may be of any preferred type, with the reservation that it must give its full reading in response to only a minute vertical movement of the free end of tube 15. The device suggested is shown in section in Fig. 2, in which 18 is the enclosing case, 19 is a drum shaft carrying the indicating hand 20 in front of the calibrated face 21, the shaft being supported on standards 22. A spiral spring 23 is attached at one end to the drum and at the other to one of the standards. A silk cord or fine wire 24 is carried around the drum for at least one full turn and made fast, the other end being attached to the free end of weighing tube 15 as shown in Fig. 1.

It is essential that, in its initial position, the floating tube 15 be exactly aligned with the outlet end 14 of the fixed discharge tube, and it is preferable that both be exactly horizontal. Also tube 15 should be so proportioned in relation to the movement of the travelling element of the scale that at no time will it depart materially from its initial position of alignment with the tube end 14. This precaution will avoid any inaccuracy which would follow from dynamic reaction, i. e., from the tendency of the tube to align itself throughout as the fluid flows through it.

The floating tube should be polished inside and of a material offering the least possible selective action for the suspensoids. When these are solid, as in the case of drilling mud, the tube may be of glass or of a noncorrosible metal. In the case of oils carrying suspended water, glass is undesirable on account of its water-wettability. In any case the velocity through the floating or weighing tube must be sufficient to keep its inner surface free from any deposit of suspended matter, and to keep the tube filled with the liquid to be weighed.

A modified form of the device is illustrated in fragmentary form in Figs. 3 and 4. In this form the stationary end of weighing tube 15 is provided with lateral branches 25—25 which are directly opposed and are supported in minute trunnion boxes 26—26. The branch tubes are supplied from a common source such as a T 27 to which they are connected by half-loops of thin and flexible rubber tubing 28—28. In this form the dynamic reaction is neutralized, since the tendency of the moving liquid from either of the branch tubes to move weighing tube 15 in one direction is exactly counterbalanced by the tendency of liquid from the other branch to move the weighing tube in the opposite direction. Since reaction is neutralized in any position which the weighing tube is free to take, the weighing tube may travel through a wider angle than in the form first described without interfering with the accuracy of the scale readings.

In either form of the invention the movement of the weighing tube 15 may be caused to actuate the pen arm or scriber arm of a recorder for making a continuous record of the weight, and the "indicating element" of the attached claim will be understood to comprehend such recorder arms.

I claim as my invention:

A device for continuously weighing flowing liquids, comprising: a substantially horizontally disposed tube supported at one end in a substantially fixed position on bearings and free to move at the other end; a weight indicating element operatively connected with the free end of said tube; oppositely disposed tubular branches flexibly communicating with said tube substantially at the points of support of said tube on said bearings; and means for flowing said liquids through said branches and said tube toward the free end of said tube at a velocity sufficient to prevent the deposition of suspensoids on the inner wall of said tube.

HALLAN N. MARSH.